United States Patent
Torlai et al.

(10) Patent No.: US 9,687,113 B2
(45) Date of Patent: Jun. 27, 2017

(54) CUTTING BOARD ASSEMBLY

(71) Applicants: Catherine M. Torlai, Issaquah, WA (US); Warren J. Rheaume, Issaquah, WA (US); Thomas L. Rheaume, Boston, MA (US); Michael J. Rheaume, Atlanta, GA (US); James P. Rheaume, Issaquah, WA (US); John S. Rheaume, Issaquah, WA (US)

(72) Inventors: Catherine M. Torlai, Issaquah, WA (US); Warren J. Rheaume, Issaquah, WA (US); Thomas L. Rheaume, Boston, MA (US); Michael J. Rheaume, Atlanta, GA (US); James P. Rheaume, Issaquah, WA (US); John S. Rheaume, Issaquah, WA (US)

( * ) Notice: Subject to any disclaimer, the term of this patent is extended or adjusted under 35 U.S.C. 154(b) by 0 days.

(21) Appl. No.: 14/643,503

(22) Filed: Mar. 10, 2015

(65) Prior Publication Data

US 2015/0257608 A1 Sep. 17, 2015

Related U.S. Application Data

(60) Provisional application No. 61/951,460, filed on Mar. 11, 2014.

(51) Int. Cl.
*A47J 47/00* (2006.01)

(52) U.S. Cl.
CPC .................... *A47J 47/005* (2013.01)

(58) Field of Classification Search
CPC ...................................... A47J 47/005
USPC .......................................................... 269/15
See application file for complete search history.

(56) References Cited

U.S. PATENT DOCUMENTS

| | | | | |
|---|---|---|---|---|
| 454,552 A * | 6/1891 | WHeeler | ............... | A47J 47/005 269/15 |
| 1,745,805 A * | 2/1930 | Miller | ................... | A47G 23/06 269/15 |
| 2,452,445 A * | 10/1948 | Ericsson | ............... | A47J 47/005 232/1 R |
| 2,609,024 A * | 9/1952 | Russ | .................... | A47J 47/005 269/15 |

(Continued)

OTHER PUBLICATIONS

Boos Cutting Board with Spout Nov. 2013 from https://web.archive.org/web/20131105214946/http://notjustbaked.com/gadgets/boos-cutting-board-giveaway-and-product-review/.*

*Primary Examiner* — Joseph J Hail
*Assistant Examiner* — Brian Keller
(74) *Attorney, Agent, or Firm* — Davis Wright Tremaine LLP; Heather M. Colburn

(57) ABSTRACT

A cutting board assembly that includes a tray and a cutting board member. The tray has a reservoir area. The cutting board member is configured to be at least partially positioned inside the reservoir area. The cutting board member has a cutting surface and at least one through-hole. Liquid on the cutting surface flows therefrom through the through-hole(s) and collects in the reservoir area of the tray. The cutting board member may have one or more channels configured to channel the liquid toward the through-hole(s). Each of the one or more channels may be tapered to help direct the liquid. Together the channel(s) and the through-hole(s) may completely surround the cutting surface. The tray may include one or more pouring grooves or spouts through which the liquid in the reservoir area may be poured therefrom.

19 Claims, 12 Drawing Sheets

(56) References Cited

U.S. PATENT DOCUMENTS

| | | | | |
|---|---|---|---|---|
| 3,598,164 | A * | 8/1971 | August | A47J 47/005 269/13 |
| 5,366,208 | A * | 11/1994 | Benjamin | A47J 47/005 269/13 |
| 5,514,443 | A * | 5/1996 | Chen | A47J 47/005 269/13 |
| 5,546,852 | A * | 8/1996 | Bidwell | A47J 47/005 210/259 |
| 5,865,105 | A * | 2/1999 | Pepelanov | A47J 47/005 269/15 |
| 6,371,470 | B1 * | 4/2002 | Ward | A47J 47/20 269/13 |
| 6,386,531 | B1 * | 5/2002 | Prosser | A47J 47/005 269/15 |
| 6,651,970 | B2 * | 11/2003 | Scott | A47J 47/005 269/13 |
| 6,722,644 | B1 * | 4/2004 | Prosser | A47J 47/005 269/289 R |
| 6,994,334 | B2 * | 2/2006 | Jones | B23Q 11/0042 269/289 R |
| 7,442,118 | B2 * | 10/2008 | Edmond | A47J 47/005 452/196 |
| 7,530,558 | B2 * | 5/2009 | Casale | A47J 47/005 269/13 |
| 7,735,816 | B2 * | 6/2010 | Hashim | A47J 47/005 269/289 R |
| 8,220,789 | B2 * | 7/2012 | Pourounidis | A47J 47/005 206/216 |
| 8,286,956 | B2 * | 10/2012 | Pearl | A47J 47/005 269/289 R |
| D687,268 | S * | 8/2013 | Difante | D7/698 |
| 8,690,133 | B1 * | 4/2014 | Hauser | A47J 47/005 269/13 |
| 8,800,984 | B2 * | 8/2014 | Constantino, Jr. | A47J 47/005 134/115 R |
| 8,985,567 | B2 * | 3/2015 | Constantino, Jr. | A47J 47/005 134/115 R |
| 2003/0094744 | A1 * | 5/2003 | scott | A47J 47/005 269/289 R |
| 2004/0119220 | A1 * | 6/2004 | Davis | A47J 47/005 269/289 R |
| 2005/0040580 | A1 * | 2/2005 | Davis | A47J 47/005 269/289 R |
| 2009/0146353 | A1 * | 6/2009 | Hashim | A47J 47/005 269/13 |
| 2013/0049275 | A1 * | 2/2013 | Morgan | A47J 47/005 269/14 |
| 2013/0241127 | A1 * | 9/2013 | Yang | A47J 47/005 269/15 |
| 2013/0256963 | A1 * | 10/2013 | Shofet | A47J 47/005 269/13 |
| 2014/0252709 | A1 * | 9/2014 | Crimmins | A47J 47/005 269/14 |

* cited by examiner

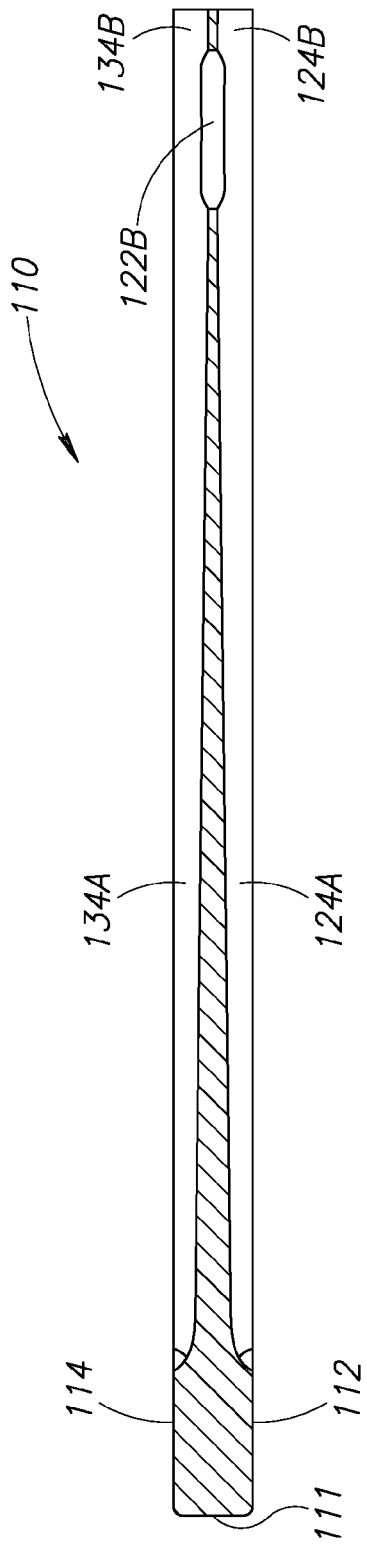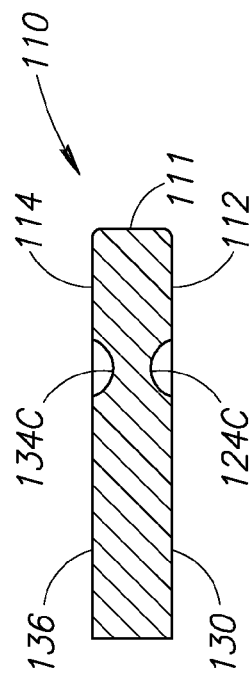

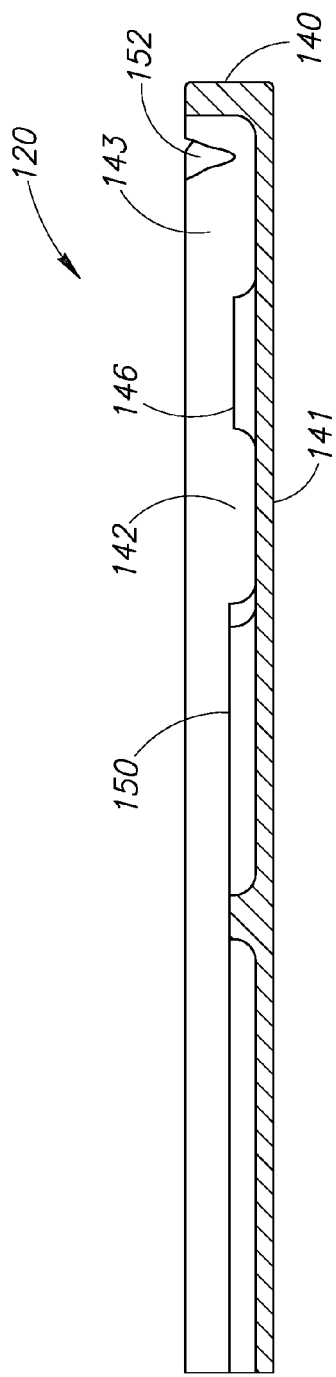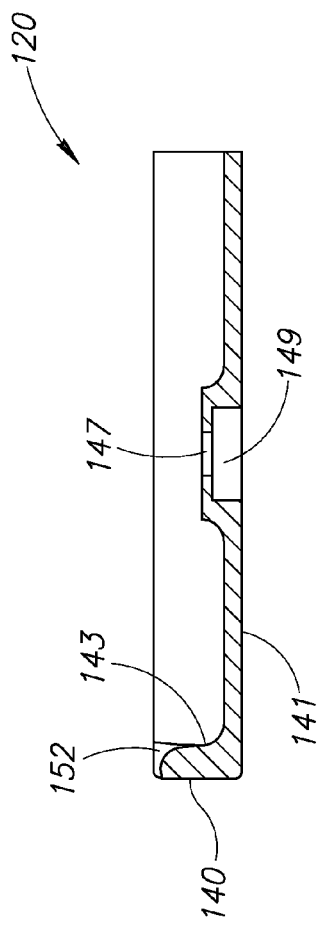

CUTTING BOARD ASSEMBLY

CROSS REFERENCE TO RELATED APPLICATION(S)

This application claims the benefit of U.S. Provisional Application No. 61/951,460, filed on Mar. 11, 2014, which is incorporated herein by reference in its entirety.

BACKGROUND OF THE INVENTION

Field of the Invention

The present invention is directed generally to cutting surfaces and more particularly to cutting boards.

Description of the Related Art

Cutting boards are commonly used in food preparation. A typical cutting board has a substantially planar upper surface upon which food items may be cut with a cutting tool such as a knife or cleaver. Unfortunately, cutting many food items releases liquid that runs over the substantially planar upper surface of the cutting board and onto surrounding structures. This can result in an undesirable mess, which, if not properly attended to, may create an unsanitary working environment. Therefore, a need exists for cutting boards configured to help prevent liquids from escaping from the cutting surface. The present application provides these and other advantages as will be apparent from the following detailed description and accompanying figures.

BRIEF DESCRIPTION OF THE SEVERAL VIEWS OF THE DRAWING(S)

FIG. 6 is a partial sectional view of the cutting board member taken through a line 6-6 depicted in FIG. 5.

FIG. 7 is a sectional view of the cutting board member taken through a line 7-7 depicted in FIG. 5.

FIG. 9 is a partial sectional view of the tray taken through a line 9-9 depicted in FIG. 8.

FIG. 10 is a sectional view of the tray taken through a line 10-10 depicted in FIG. 8.

DETAILED DESCRIPTION OF THE INVENTION

Figure 1:
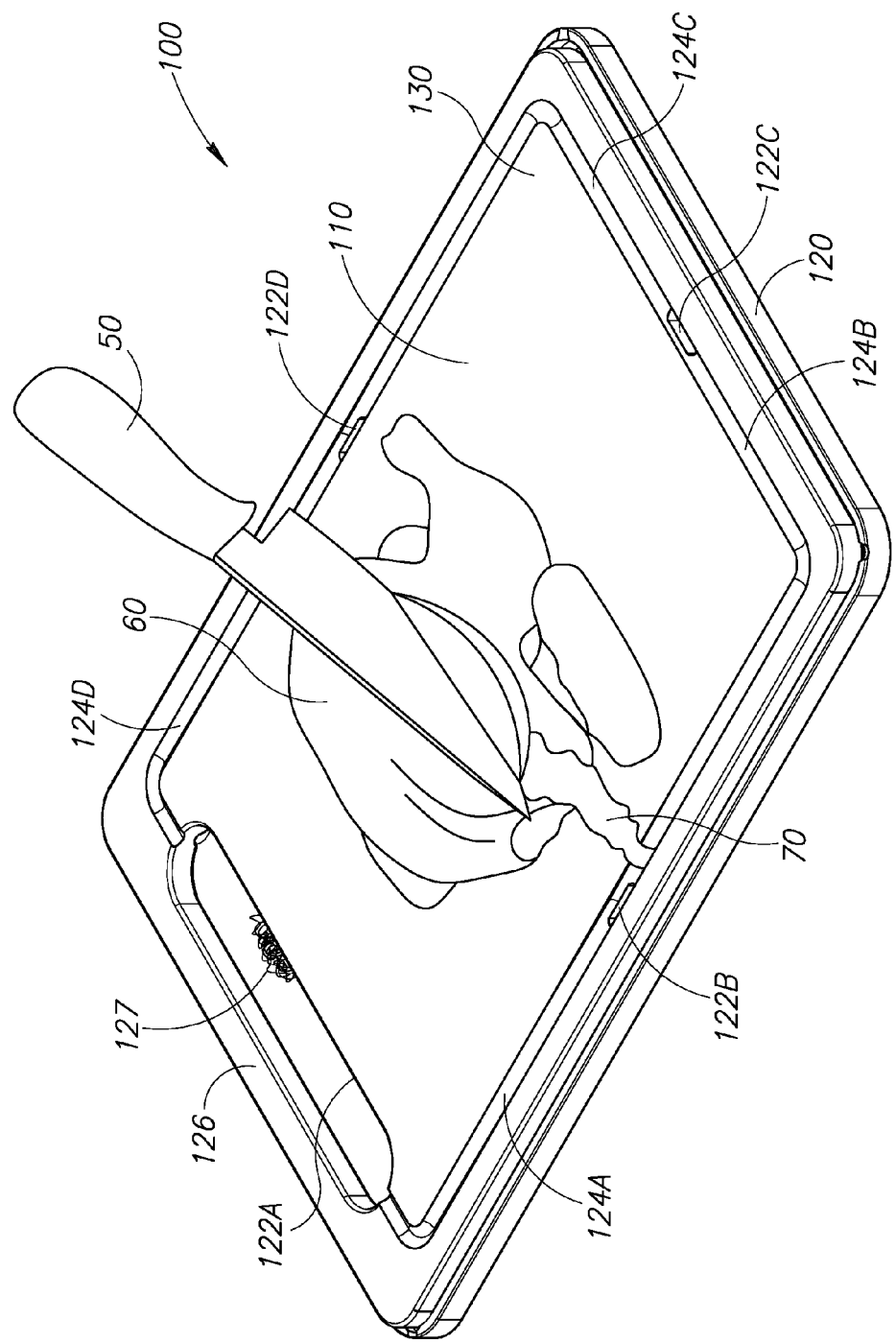
FIG. 1 is a perspective view of a first embodiment of a cutting board assembly.

FIG. 1 depicts a knife 50 cutting a food item 60 (e.g., a roast chicken) on a first embodiment of a cutting board assembly 100. When the food item 60 was cut, liquid 70 (such as one or more carving juices) was released from the food item 60. The cutting board assembly 100 includes a cutting board member 110 configured to nest at least partially inside a tray 120. The cutting board member 110 is configured to channel the liquid 70 into the tray 120, which catches and holds those liquids for later use or disposal.

Figure 2:
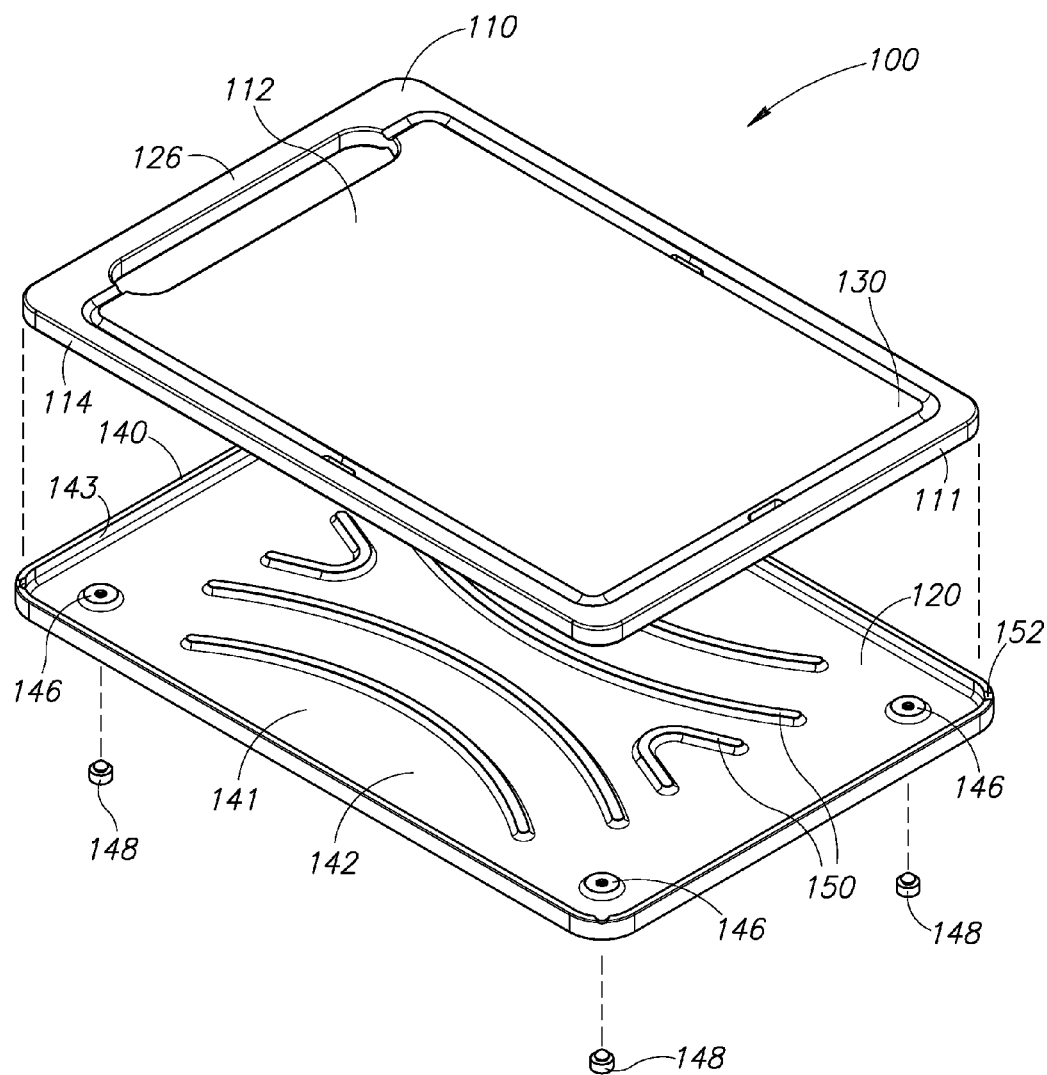
FIG. 2 is an exploded perspective view of the cutting board assembly of FIG. 1.

Referring to FIG. 2, the cutting board member 110 has an outer edge portion 111 and an upper surface 112 opposite a lower surface 114. In the embodiment illustrated, the upper surface 112 is substantially identical to the lower surface 114 so that after the upper surface 112 has been used, the cutting board member 110 may be turned over and nested with the tray 120. In this configuration, the lower surface 114 may be used instead of the upper surface 112. However, this is not a requirement.

Figure 3:
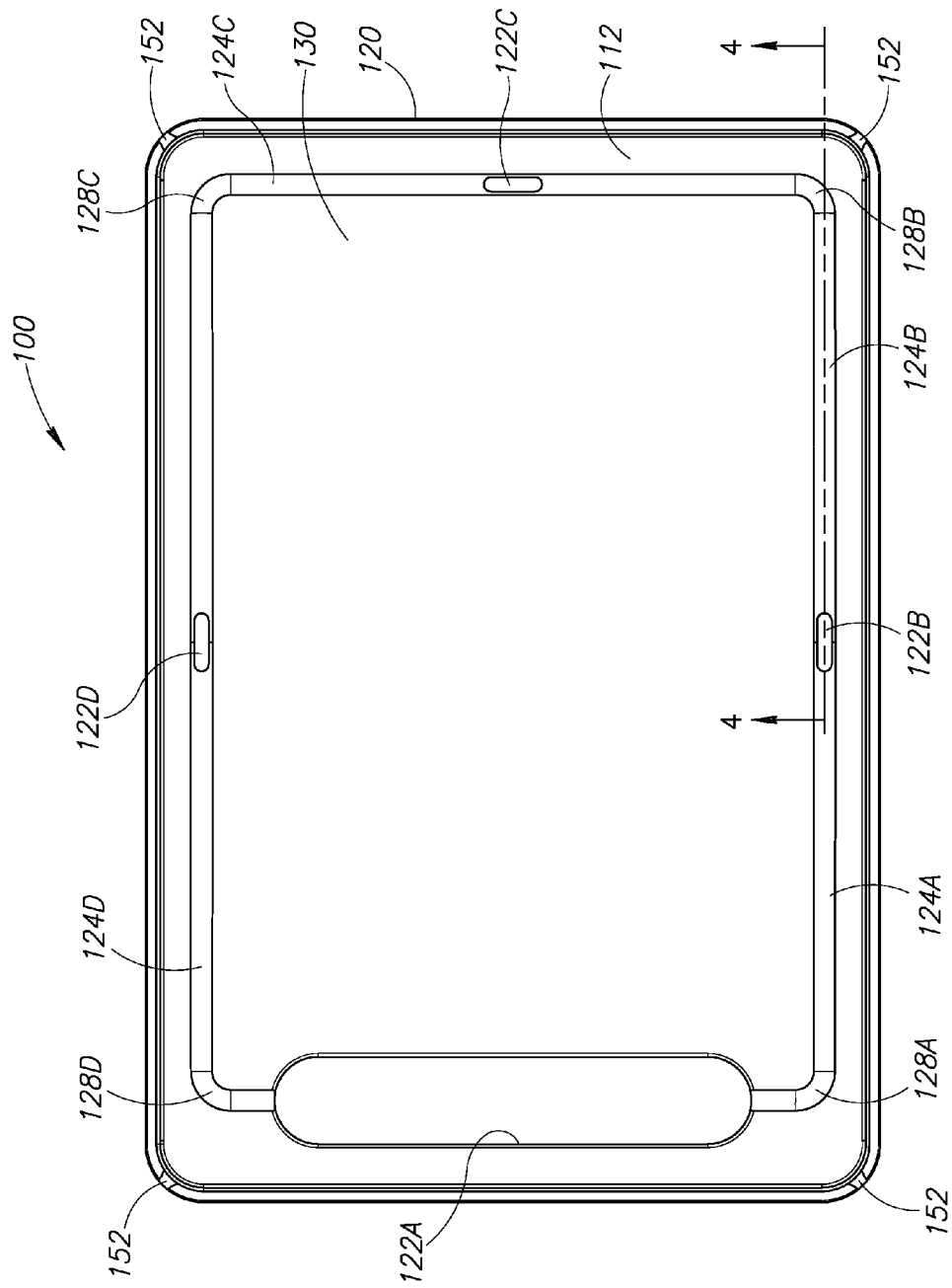
FIG. 3 is a top view of the cutting board assembly of FIG. 1.
Figure 5:
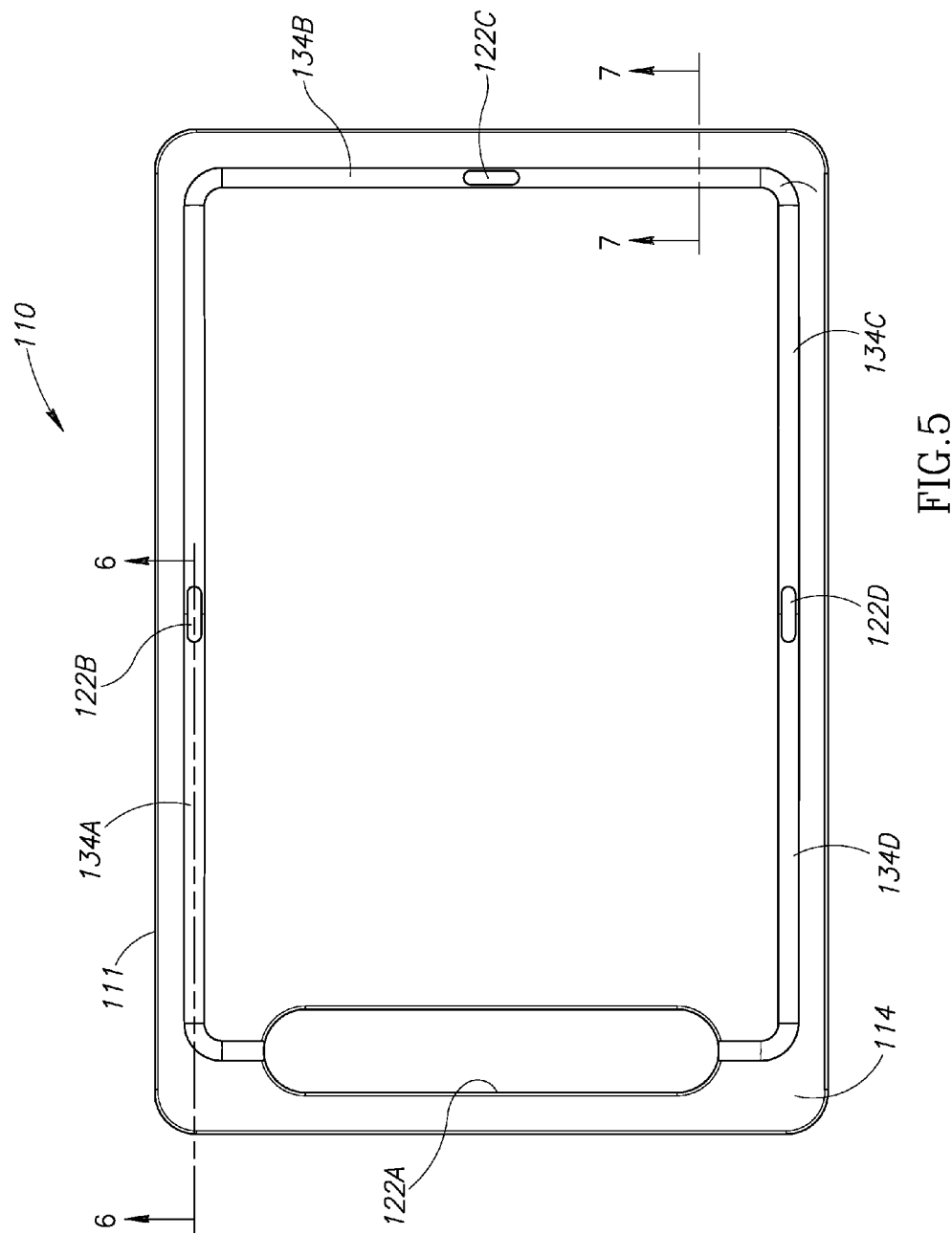
FIG. 5 is a top view of a cutting board member of the cutting board assembly of FIG. 1.

Referring to FIG. 3, a plurality of through-slots or through-holes 122A-122D extends between the upper surface 112 and the lower surface 114 (see FIGS. 2 and 5). The upper surface 112 has a plurality of upper grooves or channel sections 124A-124D configured to conduct the liquid 70 (see FIG. 1) toward the through-holes 122A-122D. In the embodiment illustrated, the upper channel sections 124A-124D interconnect the through-holes 122A-122D together in a series on the upper surface 112. In the embodiment illustrated, the upper channel section 124A interconnects the through-holes 122A and 122B, the upper channel section 124B interconnects the through-holes 122B and 122C, the upper channel section 124C interconnects the through-holes 122C and 122D, and the upper channel section 124D interconnects the through-holes 122D and 122A.

In the embodiment illustrated, the upper channel section 124A may be continuous with the upper channel section 124B, and the through-hole 122B may be configured to fit entirely within the contiguous upper channel sections 124A and 124B near or at the location where they meet. Similarly, the upper channel section 124B may be continuous with the upper channel section 124C, and the through-hole 122C may be configured to fit entirely within the contiguous upper channel sections 124B and 124C near or at the location where they meet. Further, the upper channel section 124C may be continuous with the upper channel section 124D, and the through-hole 122D may be configured to fit entirely within the contiguous upper channel sections 124C and 124D near or at the location where they meet. By way of a non-limiting example, the through-holes 122B-122D may each be about one inch long by about 0.25 inches wide.

In the embodiment illustrated, the upper channel sections 124A and 124D each terminate at the through-hole 122A, which is substantially larger than the through-holes 122B-122D. Referring to FIG. 1, solids (e.g., food scraps) and/or debris 127 may pass through the through-hole 122A into the tray 120 under the cutting board member 110. The through-hole 122A may be large enough to allow a user's fingers to pass therethrough such that a handle portion 126 is defined in the cutting board member 110. By way of a non-limiting example, the through-hole 122A may be about 1.5 inches wide.

Referring to FIG. 3, each of the upper channel sections 124A-124D tapers toward at least one of the through-holes 122A-122D to facilitate the flow of any fluids inside the upper channel section toward the through-hole(s). In the embodiment illustrated, the upper channel section 124A tapers downwardly (e.g., about seven degrees) toward the through-holes 122A and 122B to facilitate the flow of liquid toward the through-holes 122A and 122B. Thus, the upper channel section 124A has a section 128A located between the through-holes 122A and 122B that is higher than portions of the upper channel section 124A adjacent the through-holes 122A and 122B. Similarly, the upper channel section 124B tapers downwardly (e.g., about seven degrees) toward the through-holes 122B and 122C and has a section 128B located between the through-holes 122B and 122C that is higher than portions of the upper channel section 124B adjacent the through-holes 122B and 122C. Similarly, the upper channel section 124C tapers downwardly (e.g., about seven degrees) toward the through-holes 122C and 122D and has a section 128C located between the through-holes 122C and 122D that is higher than portions of the upper channel section 124C adjacent the through-holes 122C and 122D. Further, the upper channel section 124D tapers downwardly (e.g., about seven degrees) toward the through-holes 122D and 122A and has a section 128D located between the through-holes 122D and 122A that is higher than portions of the upper channel section 124D adjacent the through-holes 122D and 122A.

Together the through-holes 122A-112D and the upper channel sections 124A-124D form a perimeter that surrounds an upper cutting surface 130. Referring to FIG. 1, when the food item 60 is placed upon the upper cutting surface 130, the liquid 70 that flows outwardly from the food item 60 along the upper cutting surface 130 flows into at least one of the through-holes 122A-122D and/or the upper channel sections 124A-124D. Liquids flowing into the upper channel sections 124A-124D are conducted thereby to one or more of the through-holes 122A-122D. For example, in FIG. 1, the liquid 70 is illustrated flowing into a portion of the upper channel section 124B that will conduct the liquid 70 into the through-hole 122B. Liquids flowing into one or more of the through-holes 122A-122D flow therethrough into the tray 120. Thus, the upper channel sections 124A-124D and the through-holes 122A-122D facilitate (using gravity feed) the flow of liquids from the upper cutting surface 130 into the tray 120.

As mentioned above, the upper surface 112 may be substantially identical to the lower surface 114 (see FIGS. 2 and 5) so that after the upper surface 112 has been used, the cutting board member 110 may be turned over and nested with the tray 120 so that the lower surface 114 may be used. Referring to FIG. 5, in such embodiments, the lower surface 114 has a plurality of lower grooves or channel sections 134A-134D substantially identical to the upper channel sections 124A-124D, respectively. The lower channel sections 134A-134D are aligned with the plurality of upper channel sections 124A-124D, respectively, and interconnect the through-holes 122A-122D together in a series on the lower surface 114. For example, FIG. 6 illustrates the alignment of the lower channel section 134A with the upper channel section 124A, and the alignment of the lower channel section 134B with the upper channel section 124B. Similarly, FIG. 7 illustrates the alignment of the lower channel section 134C with the upper channel section 124C. Thus, each of the lower channel sections 134A and 134B and the upper channel sections 124A and 124B are tapered toward the through-hole 122B. Together the through-holes 122A-112D and the lower channel sections 134A-134D form a perimeter that surrounds a lower cutting surface 136 substantially identical to the upper cutting surface 130.

The cutting board member 110 may be constructed from any material suitable for constructing a cutting board, such as nylon, wood, glass, ceramic, bamboo, plastic, combinations and sub-combinations thereof, and the like. Further, the cutting board member 110 may be constructed from a dishwasher safe material. By way of a non-limiting example, the cutting board member 110 may be about 18.13 inches long, about 12.13 inches wide, and about 0.5 inches thick.

Referring to FIG. 2, the tray 120 has a continuous upwardly extending sidewall 140 surrounding a base portion 141. An upwardly opening reservoir area 142 is defined by the sidewall 140 and the base portion 141. The sidewall 140 has an inwardly facing surface 143 adjacent the reservoir area 142. The sidewall 140 is configured so that the cutting board member 110 may be positioned inside the reservoir area 142. When the cutting board member 110 is positioned inside the reservoir area 142, the sidewall 140 completely surrounds at least a lower portion of the outer edge portion 111 of the cutting board member 110. The outer edge portion 111 of the cutting board member 110 may abut or be spaced inwardly from the inwardly facing surface 143 of the sidewall 140. Any liquids (e.g., the liquid 70 illustrated in FIG. 1) that flow through the through-holes 122A-122D (see FIGS. 1, 3, and 5) flow or drip into the reservoir area 142 and are retained therein by the sidewall 140 and the base portion 141.

Figure 4:
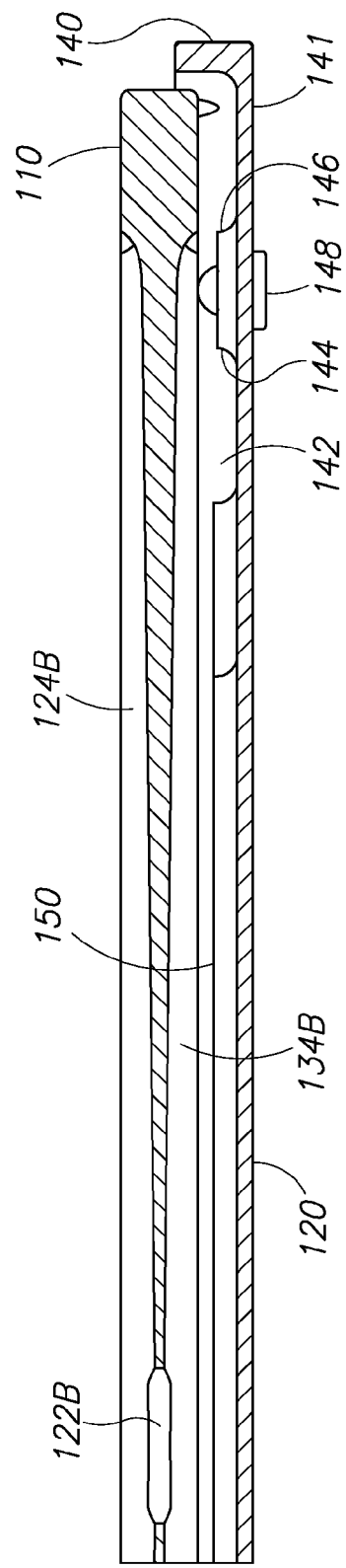
FIG. 4 is a partial sectional view of the cutting board assembly of FIG. 1 taken through a line 4-4 depicted in FIG. 3.
Figure 8:
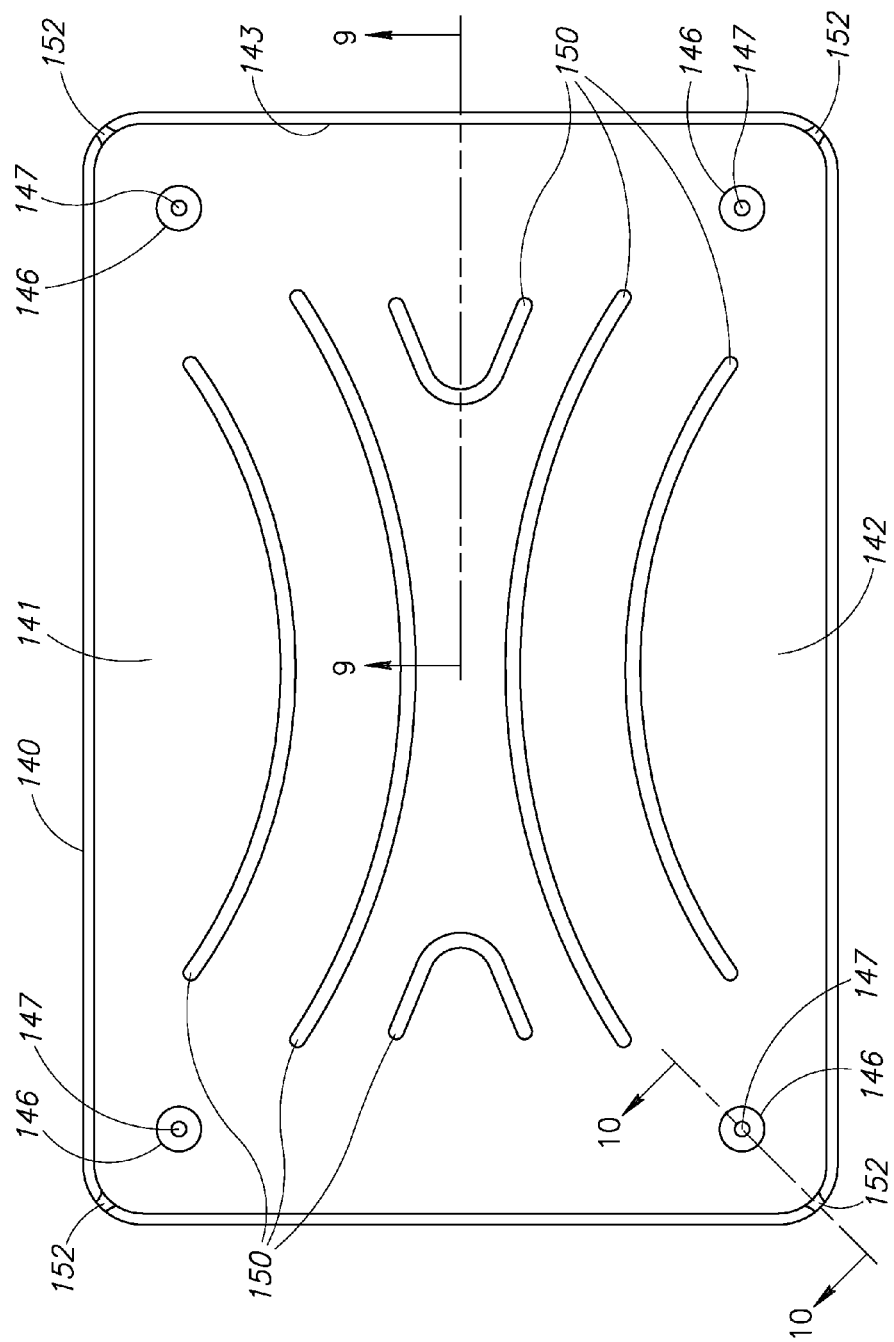
FIG. 8 is a top view of a tray member of the cutting board assembly of FIG. 1.

Referring to FIG. 4, one or more spacers or supports 144 extend upwardly from the base portion 141. The cutting board member 110 rests upon the support(s) 144 when positioned inside the reservoir area 142 so that the liquid 70 (see FIG. 1) may collect in the reservoir area 142 under the cutting board member 110. In other words, the cutting board member 110 is spaced apart from the base portion 141 by the support(s) 144. Referring to FIG. 2, in the embodiment illustrated, each support 144 (see FIG. 4) is implemented by a cushion-mounting boss 146 and a cushion member 148. Referring to FIG. 8, the cushion-mounting boss 146 includes a through-hole 147 configured to receive the cushion member 148 (see FIGS. 2 and 4). The cushion member 148 (see FIGS. 2 and 4) may be snapped into the through-hole 147 of the cushion-mounting boss 146. Referring to FIG. 4, the cushion-mounting boss 146 retains (e.g., via a friction fit) the cushion member 148. Referring to FIG. 10, optionally, the cushion-mounting boss 146 may include a downwardly opening recess 149 configured to receive and house a lower portion of the cushion member 148. The through-hole 147 is in communication with the recess 149. Thus, the cushion member 148 may extend upwardly from the recess 149 through the through-hole 147. The cushion member 148 extends upwardly beyond the cushion-mounting boss 146 so that the cutting board member 110 (see FIGS. 1-7) may rest upon and be cushioned by the cushion member 148. Referring to FIG. 4, each cushion member 148 may extend downwardly below the base portion 141 and function as a support foot for the tray 120. In such embodiments, the cushion member(s) 148 may help prevent the tray 120 from sliding along a work surface (not shown) during use.

Referring to FIGS. 2, 4, 8, and 9, optionally, the base portion 141 may include one or more baffles 150 extending upwardly into the reservoir area 142. The baffle(s) 150 may help channel any liquids collected or retained inside the reservoir area 142. Further, the baffle(s) 150 may be configured to help stiffen the tray 120. In some embodiments, the cutting board member 110 (see FIGS. 1-7) rests upon the baffle(s) 150.

Referring to FIGS. 2 and 8-10, optionally, one or more pouring grooves or channels 152 may be formed in the sidewall 140 to facilitate pouring liquids from the reservoir area 142. Each channel 152 is formed in the inwardly facing surface 143 of the sidewall 140. In the embodiment illustrated, the tray 120 is generally rectangular and one channel 152 is formed in each corner of the tray 120. Referring to FIG. 8, the baffle(s) 150 may be configured to direct any liquids collected in the reservoir area 142 toward the channel (s) 152. Referring to FIG. 2, the cutting board member 110 may remain nested with the tray 120 when the liquid collected in the reservoir area 142 is poured from the tray 120 through the channel(s) 152. For example, a user may hold the cutting board member 110 and the tray 120 together with the user's hands while pouring the liquid from the tray 120 through the channel(s) 152. Alternatively, the cutting board member 110 may be removed from the tray 120 before the liquid collected in the reservoir area 142 is poured from the tray 120 (e.g., through the channel(s) 152 or otherwise).

The tray 120 may be constructed from any material suitable for constructing a tray, such as nylon, wood, glass, ceramic, bamboo, plastic, metal, combinations and subcombinations thereof, and the like. Further, the cutting board member 110 and the tray 120 may be constructed from the same or different materials. The tray 120 may be constructed from a dishwasher safe material. By way of a non-limiting example, the tray 120 may be about 18.63 inches long, about 12.63 inches wide, and about 0.5 inches tall.

Together the cutting board member 110 and the tray 120 may be included in (e.g., packaged into) a kit for constructing the cutting board assembly 100. Such a kit may optionally include the cushion member(s) 148.

Alternate Embodiment

Figure 11:
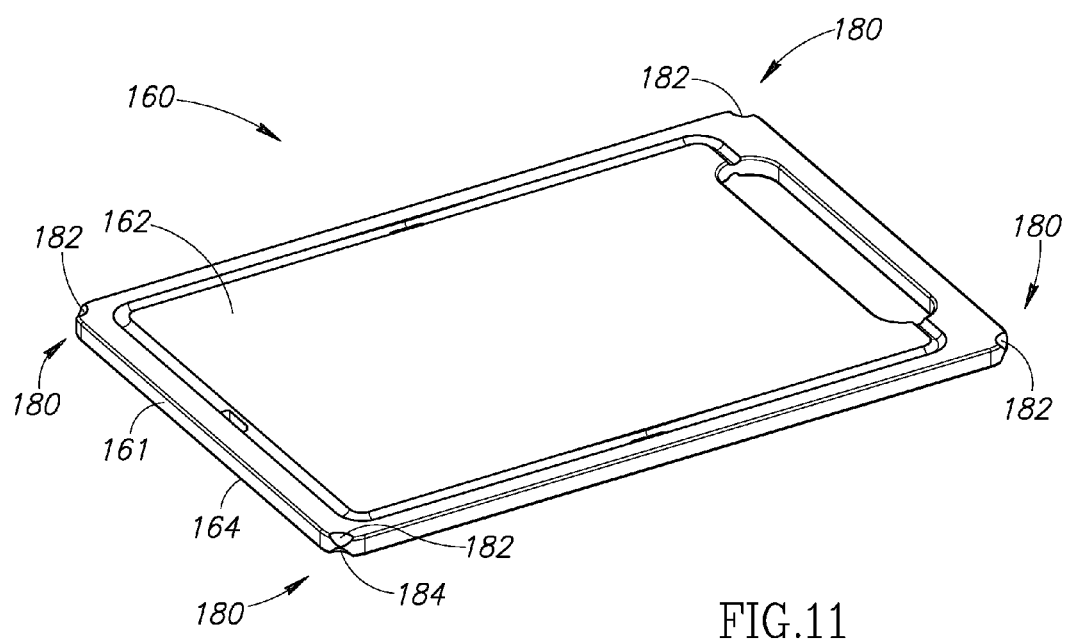
FIG. 11 is a top perspective view of an alternate embodiment of a cutting board member that may be used to construct a second embodiment of a cutting board assembly.
Figure 12:
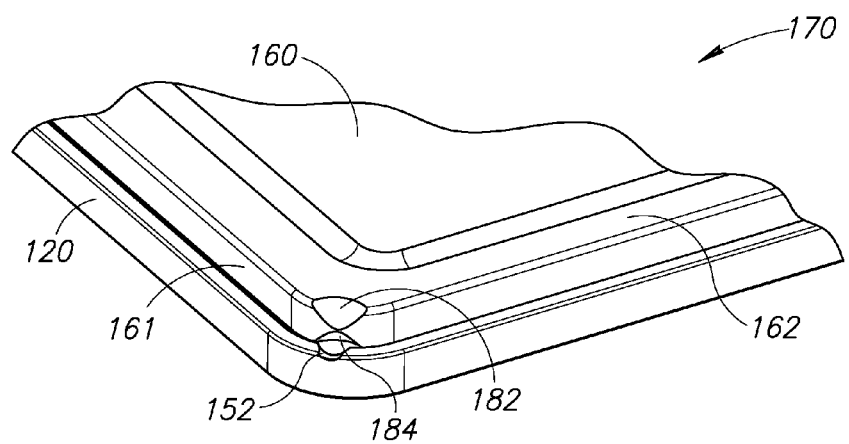
FIG. 12 is an enlarged view of a corner of the second embodiment of the cutting board assembly constructed using the cutting board member of FIG. 11.

FIGS. 11 and 12 depict an alternate embodiment of a cutting board member 160 that may be used with the tray 120 (see FIGS. 1-4, 8-10, and 12) to create a cutting board assembly 170 (see FIG. 12). Referring to FIG. 11, the cutting board member 160 has an outer edge portion 161 and an upper surface 162 opposite a lower surface 164. In the embodiment illustrated, the upper surface 162 is substantially identical to the lower surface 164 so that after the upper surface 162 has been used, the cutting board member 160 may be turned over and nested with the tray 120 (see FIGS. 1-4, 8-10, and 12). In this configuration, the lower surface 164 may be used instead of the upper surface 162. However, this is not a requirement.

The cutting board member 160 differs from the cutting board member 110 (see FIGS. 1-7) in only one respect. Specifically, a pair of grooves or notches 180 is formed in the outer edge portion 161 for each channel 152 (see FIGS. 2, 3, 8-10 and 12) formed in the tray 120 (see FIGS. 1-4, 8-10, and 12). Each pair of notches 180 includes an upper notch 182 and a lower notch 184. The upper and lower notches 182 and 184 extend onto the upper and lower surfaces 162 and 164, respectively. The notch(es) 182 formed in the upper surface 162 may be aligned with the notch(es) 184 formed in the lower surface 164.

Referring to FIG. 12, when the cutting board member 160 is at least partially nested inside the tray 120 with the upper surface 162 facing upwardly, each lower notch 184 is positioned directly above a corresponding one of the channel (s) 152. In this configuration, when liquid (e.g., the liquid 70 illustrated in FIG. 1) is being poured from a selected channel 152, the liquid may flow through the lower notch 184 corresponding to the selected channel 152. The lower notch 184 corresponding to the selected channel 152 may help channel the liquid being poured from the tray 120 via the selected channel 152. Similarly, when the cutting board member 160 is at least partially nested inside the tray 120 with the lower surface 164 (see FIG. 11) facing upwardly, each notch 182 formed in the upper surface 162 is positioned directly above a corresponding one of the channel(s) 152. In this configuration, when liquid (e.g., the liquid 70 illustrated in FIG. 1) is being poured from a selected channel 152, the liquid may flow through the upper notch 182 corresponding to the selected channel 152. The upper notch 182 corresponding to the selected channel 152 may help channel the liquid being poured from the tray 120 via the selected channel 152.

Together the cutting board member 160 and the tray 120 may be included in (e.g., packaged into) a kit for constructing the cutting board assembly 170. Such a kit may optionally include the cushion member(s) 148.

Alternate Embodiment

Figure 13:
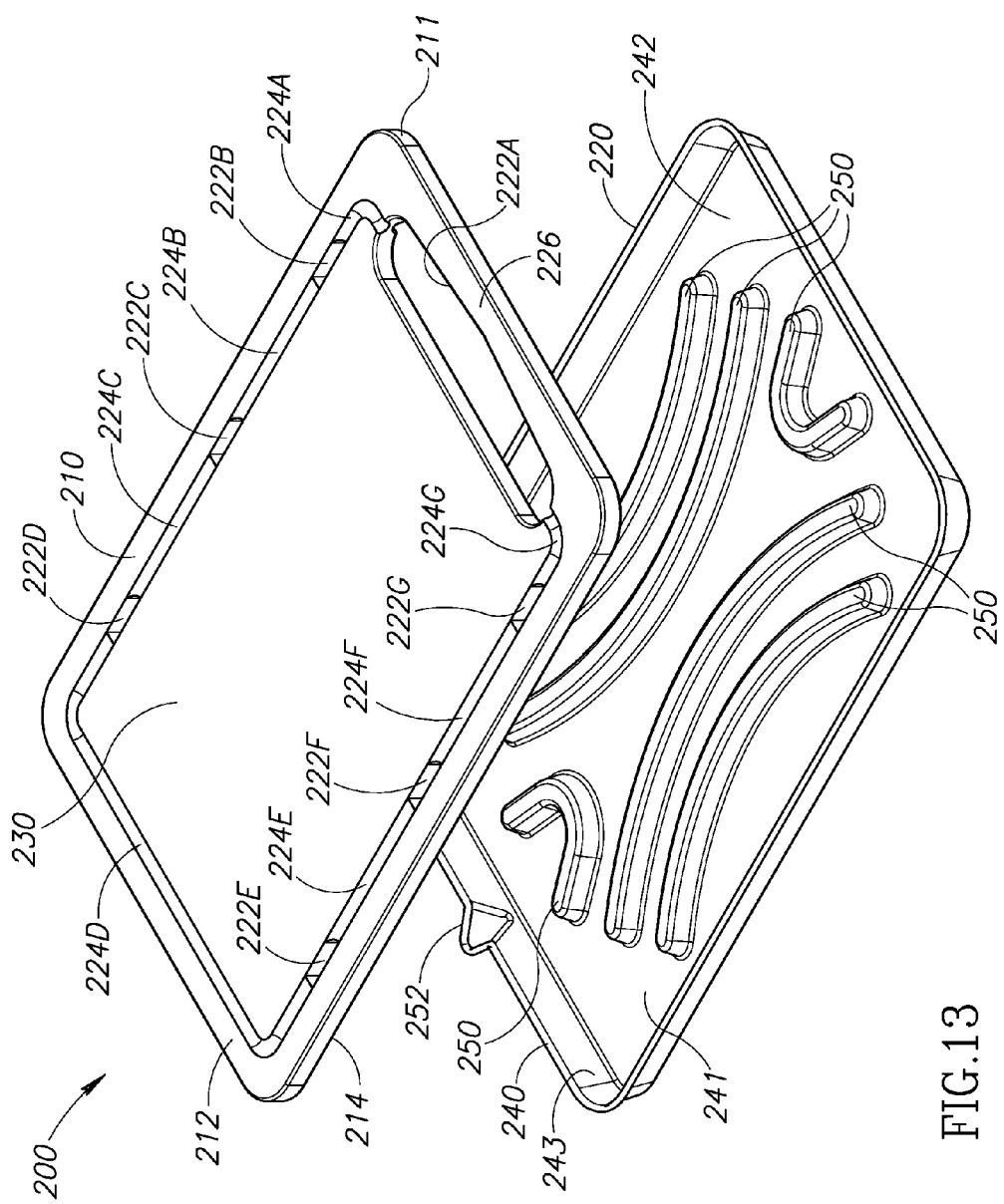
FIG. 13 is an exploded top perspective view of a third embodiment of a cutting board assembly.
Figure 14:
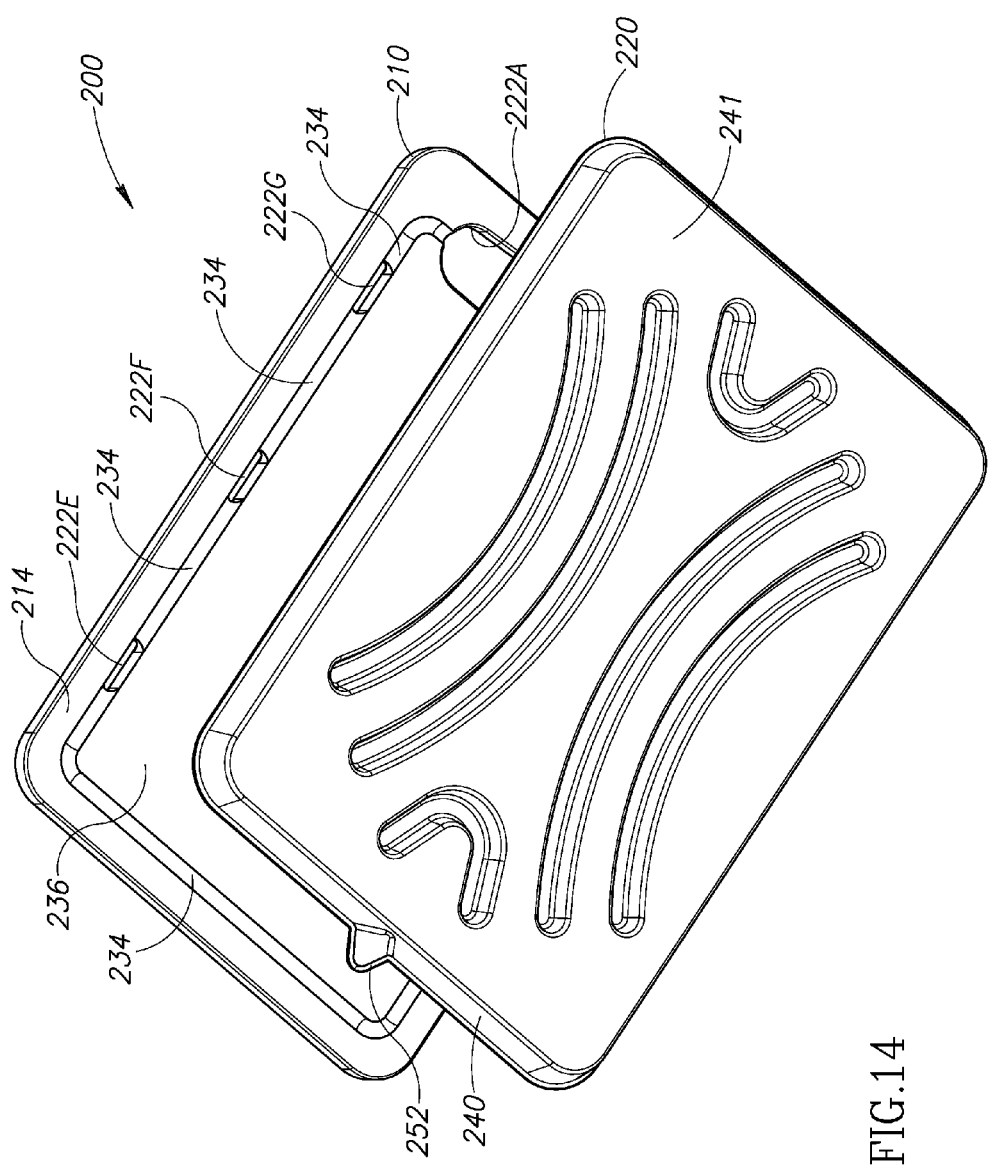
FIG. 14 is an exploded bottom perspective view of the third embodiment of the cutting board assembly.
Figure 15:
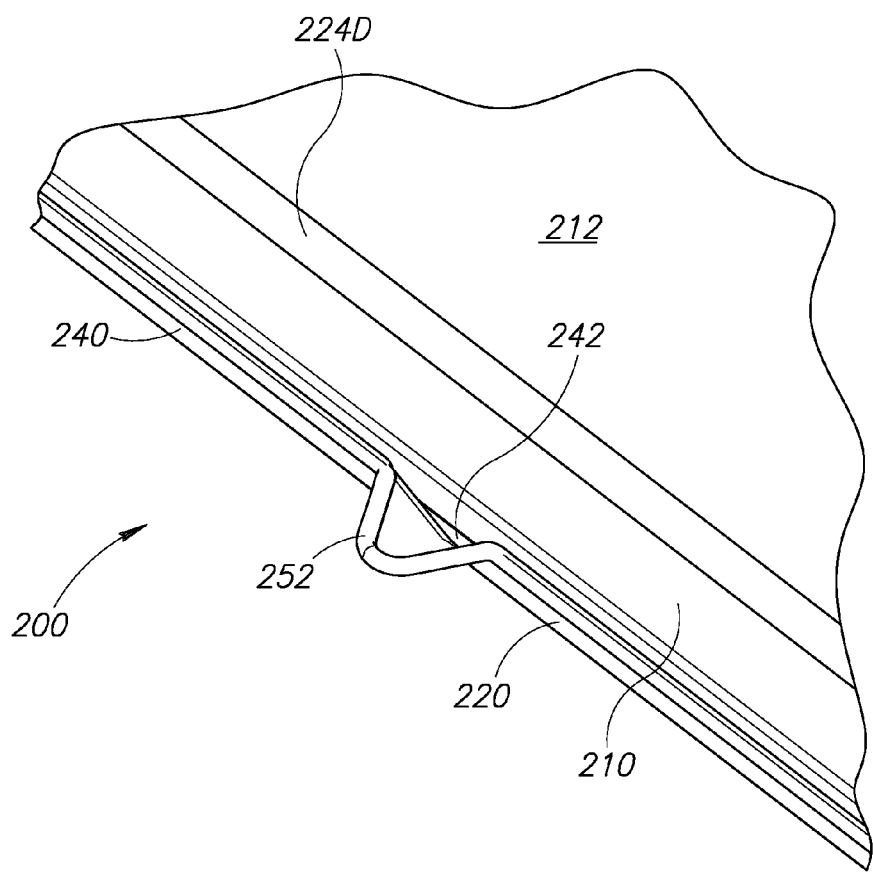
FIG. 15 is an enlarged perspective view of a pour spout formed in a tray of the third embodiment of the cutting board assembly.

FIGS. 13-15 depict a third embodiment of a cutting board assembly 200. The cutting board assembly 200 includes a cutting board member 210 configured to nest at least partially inside a tray 220. The cutting board member 210 is configured to channel liquid (e.g., the liquid 70 depicted in FIG. 1) into the tray 220, which catches and holds the liquid for later use or disposal. The cutting board member 210 may be constructed from any material suitable for constructing the cutting board member 110 (see FIGS. 1-7), and the tray 220 may be constructed from any material suitable for constructing the tray 120 (see FIGS. 1-4, 8-10, and 12).

The cutting board member 210 is substantially similar to the cutting board member 110 (see FIGS. 1-7) and provides substantially similar functionality. Referring to FIG. 13, the cutting board member 210 has an outer edge portion 211 and an upper surface 212 opposite a lower surface 214. In the embodiment illustrated, the upper surface 212 is substantially identical to the lower surface 214 so that after the upper surface 212 has been used, the cutting board member 210 may be turned over and nested with the tray 220. In this configuration, the lower surface 214 may be used instead of the upper surface 212. However, this is not a requirement.

A plurality of through-slots or through-holes 222A-222G extend between the upper surface 212 and the lower surface 214. The upper surface 212 has a plurality of upper grooves or channel sections 224A-224G configured to conduct liquid (e.g., the liquid 70 illustrated in FIG. 1) toward the through-holes 222A-222G. In the embodiment illustrated, the upper channel section 224A interconnects the through-holes 222A and 222B, the upper channel section 224B interconnects the through-holes 222B and 222C, the upper channel section 224C interconnects the through-holes 222C and 222D, the upper channel section 224D interconnects the through-holes 222D and 222E, the upper channel section 224E interconnects the through-holes 222E and 222F, the upper channel section 224F interconnects the through-holes 222F and 222G, and the upper channel section 224G interconnects the through-holes 222G and 222A.

In the embodiment illustrated, the upper channel sections 224A and 224G each terminate at the through-hole 222A, which is substantially larger than the through-holes 222B-222G. Solids (e.g., food scraps) and/or debris (e.g., the debris 127 illustrated in FIG. 1) may pass through the through-hole 222A into the tray 220 under the cutting board member 210. The through-hole 222A may be large enough to allow a user's fingers to pass therethrough such that a handle portion 226 is defined in the cutting board member 210.

Each of the upper channel sections 224A-224G may taper toward at least one of the through-holes 222A-222G to facilitate the flow of any fluids inside the upper channel section toward the through-hole(s). However, this is not a requirement.

Together the through-holes 222A-222G and the upper channel sections 224A-224G form a perimeter that surrounds an upper cutting surface 230. When a food item (e.g., the food item 60 illustrated in FIG. 1) is placed upon the upper cutting surface 230, liquid (e.g., the liquid 70 illustrated in FIG. 1) that flows outwardly from the food item along the upper cutting surface 230 flows into at least one of the through-holes 222A-222G and/or the upper channel sections 224A-224G. Liquid flowing into the upper channel sections 224A-224G is conducted thereby to one or more of the through-holes 222A-222G. Liquid flowing into one or more of the through-holes 222A-222G flows therethrough into the tray 220. Thus, the upper channel sections 224A-224G and the through-holes 222A-222G facilitate (using gravity feed) the flow of liquids from the upper cutting surface 230 into the tray 220.

As mentioned above, the upper surface 212 may be substantially identical to the lower surface 214. Referring to FIG. 14, in such embodiments, the lower surface 214 has a plurality of lower grooves or channel sections 234 substantially identical to the upper channel sections 224A-224G. The lower channel sections 234 are aligned with the plurality of upper channel sections 224A-224G and interconnect the through-holes 222A-222G together in a series on the lower surface 214. Together the through-holes 222A-212G and the lower channel sections 234 form a perimeter that surrounds a lower cutting surface 236 substantially identical to the upper cutting surface 230.

Referring to FIG. 13, the tray 220 is substantially similar to the tray 120 (see FIGS. 1-4, 8-10, and 12) and provides substantially similar functionality. Referring to FIG. 13, the tray 220 has a continuous upwardly extending sidewall 240 surrounding a base portion 241. An upwardly opening reservoir area 242 is defined by the sidewall 240 and the base portion 241. The sidewall 240 has an inwardly facing surface 243 adjacent the reservoir area 242. The sidewall 240 is configured so that the cutting board member 210 may be positioned or nested at least partially inside the reservoir area 242. The sidewall 240 may taper outwardly away from the base portion 241 to facilitate receiving the cutting board member 210 into the reservoir area 242. When the cutting board member 210 is positioned inside the reservoir area 242, the cutting board member 210 may rest upon the sidewall 240, which completely surrounds at least a lower portion of the outer edge portion 211 of the cutting board member 210. In this manner, the cutting board member 210 may be spaced apart from the base portion 241 so that the liquid (e.g., the liquid 70 illustrated in FIG. 1) may collect in the reservoir area 242 under the cutting board member 210. Any liquid (e.g., the liquid 70 illustrated in FIG. 1) that flows through the through-holes 222A-222G flows or drips into the reservoir area 242 and is retained therein by the sidewall 240 and the base portion 241.

The base portion 241 includes one or more baffles 250 substantially identical to the baffles 150 (see FIGS. 2, 4, 8, and 9). Each baffle 250 extends upwardly into the reservoir area 242. In the embodiment illustrated, the cutting board member 210 may rest upon the baffle(s) 250. In this manner, the cutting board member 210 may be spaced apart from the base portion 241 by the baffle(s) 250 so that liquid (e.g., the liquid 70 illustrated in FIG. 1) may collect in the reservoir area 242 under the cutting board member 210. The baffle(s) 250 may be configured to help channel any liquids collected or retained inside the reservoir area 242. Further, the baffle(s) 250 may be configured to help stiffen the tray 220.

Referring to FIG. 15, optionally, one or more pour spouts 252 may be formed in the sidewall 240 to facilitate pouring liquids from the reservoir area 242. Referring to FIG. 13, the baffle(s) 250 may be configured to direct any liquids collected in the reservoir area 242 toward the pour spout(s) 252. The cutting board member 210 may remain nested with the tray 220 when the liquid collected in the reservoir area 242 is poured from the tray 220 through the pour spout(s) 252. For example, the user may hold the cutting board member 210 and the tray 220 together with the user's hands while pouring the liquid from the tray 220 through the pour spout(s) 252. Alternatively, the cutting board member 210 may be removed from the tray 220 before the liquid collected in the reservoir area 242 is poured from the tray 220 (e.g., through the pour spout(s) 252 or otherwise).

Together the cutting board member 210 and the tray 220 may be included in (e.g., packaged into) a kit for constructing the cutting board assembly 200.

In the embodiments illustrated, the cutting board assemblies 100 and 200 each has a generally rectangular outer shape when viewed from above. However, through application of the present teachings, one of ordinary skill in the art may construct embodiments of the cutting board assemblies 100 and 200 that have other outer shapes, such as square, round, oval, fanciful, arbitrary, and the like.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A cutting board assembly comprising:
a tray comprising a sidewall, a base portion, and one or more supports, the sidewall surrounding the base portion, the sidewall and the base portion defining a reservoir area, the one or more supports being spaced inwardly and apart from the sidewall and extending upwardly from the base portion, the sidewall having a tray corner with a pouring channel formed therein; and
a cutting board member configured to be positioned on the one or more supports, the one or more supports being configured to support the cutting board member and space the cutting board member apart from the base portion, the cutting board member having a board corner, a side surface, an upwardly facing surface, a downwardly facing surface, and at least one through-hole, the at least one through-hole being configured to allow liquid on the upwardly facing surface to flow therefrom and collect in the reservoir area of the tray, the board corner comprising a notch that extends from the downwardly facing surface toward the side surface, the notch being positioned directly above the pouring channel, the pouring channel and the notch being configured to allow the liquid collected in the reservoir area to be poured through the pouring channel and the notch.

2. The cutting board assembly of claim 1, wherein the tray comprises one or more baffles that extend upwardly from the base portion, the one or more baffles being configured to direct the liquid collected in the reservoir area of the tray toward the pouring channel.

3. The cutting board assembly of claim 1, wherein the tray comprises one or more baffles that extend upwardly from the base portion, the one or more baffles being configured to help stiffen the tray.

4. The cutting board assembly of claim 1, wherein the cutting board member comprises one or more channels configured to channel the liquid toward the at least one through-hole, and
the notch is spaced apart from the one or more channels.

5. The cutting board assembly of claim 4, wherein each of the one or more channels tapers toward the at least one through-hole to help direct the liquid toward the at least one through-hole.

6. The cutting board assembly of claim 4, wherein the one or more channels and the at least one through-hole are positioned around a cutting portion of the upwardly facing surface.

7. The cutting board assembly of claim 4, wherein together the one or more channels and the at least one through-hole completely surround a cutting portion of the upwardly facing surface.

8. The cutting board assembly of claim 1, wherein each of the one or more supports comprises a cushion member upon which the cutting board member rests when the cutting board member is supported by the one or more supports.

9. The cutting board assembly of claim 1, wherein the notch is a first notch,
the board corner has a second notch aligned with the first notch,
the second notch extends from the upwardly facing surface toward the side surface,
the cutting board member is rotatable with respect to the tray so that either the upwardly facing surface or the downwardly facing surface is positionable upon the one or more supports, and
the second notch is positioned directly above the pouring channel when the upwardly facing surface is positioned upon the one or more supports such that the liquid collected in the reservoir area is pourable from the reservoir area through both the pouring channel and the second notch.

10. The cutting board assembly of claim 1, wherein the one or more supports are positioned interiorly to the side surface when the cutting board member is positioned on the one or more supports.

11. A cutting board assembly comprising:
a tray comprising a sidewall, a base portion, and one or more supports, the sidewall extending upwardly from the base portion, the sidewall and the base portion defining an upwardly opening reservoir area, the one or more supports being spaced inwardly and apart from the sidewall and extending upwardly from the base portion, the sidewall having a tray corner with a pouring channel formed therein; and
a cutting board member configured to be positioned on the one or more supports, the one or more supports being configured to support the cutting board member and space the cutting board member apart from the base portion, the cutting board member having a board corner, a side surface, an upwardly facing surface, and a downwardly facing surface, the upwardly facing surface having a cutting portion surrounded by one or more channel sections interconnecting a plurality of through-holes, the one or more channel sections being configured to direct liquid from the cutting portion into the plurality of through-holes, the plurality of through-holes being configured to allow the liquid to flow therethrough and into the reservoir area of the tray, the board corner comprising a notch that extends from the downwardly facing surface toward the side surface, the notch being positioned directly above the pouring channel, the notch being spaced apart and separate from the one or more channel sections, the pouring channel and the notch being configured to allow the liquid collected in the reservoir area to be poured through the pouring channel and the notch.

12. The cutting board assembly of claim 11, wherein each of the one or more channel sections tapers toward at least one of the plurality of through-holes to help direct the liquid toward the at least one through-hole.

13. The cutting board assembly of claim 11, wherein each of the one or more supports comprises a cushion member upon which the cutting board member rests when the cutting board member is supported by the one or more supports.

14. The cutting board assembly of claim 11, wherein the one or more supports are positioned interiorly to the side surface when the cutting board member is positioned on the one or more supports.

15. A kit comprising:
a tray having an upwardly extending sidewall, a base portion, and one or more supports, the base portion being surrounded by the upwardly extending sidewall, the one or more supports being spaced inwardly and apart from the sidewall and extending upwardly from the base portion, the sidewall having a tray corner with a pouring channel formed therein; and
a cutting board member configured to be positioned on the one or more supports, the one or more supports being configured to support the cutting board member and space the cutting board member apart from the base portion, the cutting board member having a board corner, a side surface, an upwardly facing surface, and a downwardly facing surface, the upwardly facing surface having a cutting portion surrounded by one or more channel sections interconnecting a plurality of through-holes, the one or more channel sections being configured to direct liquid from the cutting portion into the plurality of through-holes, the plurality of through-holes being configured to allow the liquid to flow therethrough and into the tray, the board corner comprising a notch that extends from the downwardly facing surface toward the side surface, the notch being positioned directly above the pouring channel, the notch being spaced apart and separate from the one or more channel sections, the pouring channel and the notch being configured to allow the liquid to be poured from the tray through the pouring channel and the notch.

16. The kit of claim 15, wherein the cutting board member is rotatable with respect to the tray so that either the upwardly facing surface or the downwardly facing surface is positionable upon the one or more supports.

17. The kit of claim 15, wherein the one or more supports are positioned interiorly to the side surface when the cutting board member is positioned on the one or more supports.

18. A kit comprising:
a tray comprising a sidewall, a base portion, and one or more supports, the sidewall extending upwardly from the base portion, the sidewall and the base portion defining an upwardly opening reservoir area, the one or more supports being spaced inwardly and apart from the sidewall and extending upwardly from the base portion, the sidewall having a plurality of second corners each with a pour channel; and
a cutting board member configured to be positioned on the one or more supports, the one or more supports being configured to support the cutting board member and space the cutting board member apart from the base portion, the cutting board member having a plurality of first corners, a side surface, an upwardly facing surface, and a downwardly facing surface, the upwardly facing surface having a cutting portion surrounded by one or more channel sections interconnecting a plurality of through-holes, the one or more channel sections being configured to direct liquid from the cutting portion into the plurality of through-holes, the plurality of through-holes being configured to allow the liquid to flow therethrough and into the tray, each of the plurality of first corners having a notch that extends from the downwardly facing surface toward the side surface, each notch being spaced apart and separate from the one or more channel sections,
each of the plurality of first corners being positioned near a different corresponding one of the plurality of second corners when the cutting board member is supported by the one or more supports, and
the notch of a selected one of the plurality of first corners being positioned directly above the pouring channel of a selected one of the plurality of second corners that corresponds to the selected first corner, the notch of the selected first corner and the pouring channel of the selected second corner being configured to allow the liquid to be poured therethrough.

19. A cutting board assembly comprising:
a tray comprising a sidewall, a base portion, and one or more supports, the sidewall surrounding the base portion, the sidewall and the base portion defining a reservoir area, the one or more supports being spaced inwardly and apart from the sidewall and extending upwardly from the base portion, the sidewall has a plurality of second corners each with a pour channel formed therein; and
a cutting board member configured to be positioned on the one or more supports, the one or more supports being configured to support the cutting board member and space the cutting board member apart from the base portion, the cutting board member having a plurality of first corners, a side surface, an upwardly facing surface, a downwardly facing surface, and at least one through-hole, the at least one through-hole being configured to allow liquid on the upwardly facing surface to flow therefrom and collect in the reservoir area of the tray, each of the plurality of first corners comprising a notch that extends from the downwardly facing surface toward the side surface,
each of the plurality of first corners being positioned near a different corresponding one of the plurality of second corners when the cutting board member is supported by the one or more supports,
the notch of a selected one of the plurality of first corners being positioned directly above the pour channel of a selected one of the plurality of second corners corresponding to the selected first corner, the notch of the selected first corner and the pouring channel of the selected second corner being configured to allow the liquid to be poured therethrough.

* * * * *